United States Patent
Bohl et al.

(10) Patent No.: US 10,851,827 B2
(45) Date of Patent: Dec. 1, 2020

(54) VEHICLE COMPONENT FASTENER WITH ENHANCED PRE-LOCKING

(71) Applicant: ILLINOIS TOOL WORKS INC., Glenview, IL (US)

(72) Inventors: Marina Bohl, Schneckenhausen (DE); Thiemo Ammann, Rockenhausen (DE); Markus Elsner, Munich (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 233 days.

(21) Appl. No.: 16/177,897

(22) Filed: Nov. 1, 2018

(65) Prior Publication Data
US 2019/0136903 A1    May 9, 2019

(30) Foreign Application Priority Data
Nov. 3, 2017   (DE) ................ 10 2017 125 771

(51) Int. Cl.
*F16B 41/00*    (2006.01)
*F16B 21/07*    (2006.01)
*F16B 21/10*    (2006.01)

(52) U.S. Cl.
CPC ............ *F16B 41/00* (2013.01); *F16B 21/073* (2013.01); *F16B 21/078* (2013.01); *F16B 21/10* (2013.01); *Y10T 24/303* (2015.01)

(58) Field of Classification Search
CPC ...... F16B 41/00; F16B 21/073; F16B 21/078; F16B 21/065; F16B 21/06; F16B 21/10; F16B 5/10; Y10T 403/32803; Y10T 403/32737; Y10T 24/45105; Y10T 24/309; Y10T 24/303; Y10T 24/344

USPC ................................... 411/511, 512
See application file for complete search history.

(56) References Cited

U.S. PATENT DOCUMENTS

| 4,176,428 A * | 12/1979 | Kimura | ............... B60R 13/0206 24/297 |
| 6,264,393 B1 * | 7/2001 | Kraus | ................. B60R 13/0206 24/297 |
| 8,776,326 B2 * | 7/2014 | Clarke | ................. F16B 21/186 24/297 |

(Continued)

FOREIGN PATENT DOCUMENTS

| DE | 4225540 C1 * | 11/1993 | ............. E04H 15/64 |
| DE | 10 2010 030 964 | 1/2012 | |
| WO | WO-2014082848 A1 * | 6/2014 | ............ F16B 5/0642 |

*Primary Examiner* — Victor D Batson
*Assistant Examiner* — Amit Singh Dhillon
(74) *Attorney, Agent, or Firm* — Thompson Hine LLP

(57) ABSTRACT

A vehicle component fastener for fastening a first component to a second component of a vehicle, including a first part having a pin socket for receiving a head of a pin of the second component, and a second part having a fastening structure for fastening of the first component. The first part and the second part are connected to each other via a preassembly locking device in a preassembly position from which axial displacement into a final assembly position can occur. The preassembly locking device is releasable by introduction of the head of the ball pin or T pin into the pin socket such that the axial displacement into the final assembly position a) can be carried out with less effort than when the head of the ball pin or T pin is not introduced into the pin socket, or b) can be carried out at all.

15 Claims, 3 Drawing Sheets

(56) References Cited

U.S. PATENT DOCUMENTS

| | | | |
|---|---|---|---|
| 2011/0113598 A1* | 5/2011 | Hofmann | F16B 19/1081 |
| | | | 24/458 |
| 2011/0247172 A1* | 10/2011 | Yoshii | F16B 21/073 |
| | | | 16/2.1 |
| 2013/0125372 A1 | 5/2013 | van Niekerk | |
| 2013/0216297 A1* | 8/2013 | Albach | F16B 21/075 |
| | | | 403/20 |
| 2016/0123363 A1* | 5/2016 | Hammer | F16B 5/0642 |
| | | | 24/708.6 |
| 2016/0138626 A1* | 5/2016 | Van Niekerk | F16B 5/0657 |
| | | | 24/594.1 |
| 2017/0097026 A1* | 4/2017 | Korber | F16B 21/065 |
| 2018/0252252 A1* | 9/2018 | Fritzsch | F16B 21/078 |

* cited by examiner

VEHICLE COMPONENT FASTENER WITH ENHANCED PRE-LOCKING

TECHNICAL FIELD

The invention relates in general to a vehicle component fastener for fastening components to ball pins or T pins.

BACKGROUND

DE 10 2010 030 964 A1 discloses a fastening arrangement for fastening a first motor vehicle part to a second motor vehicle part, comprising at least one first and at least one second fastening element which are connectable to each other in a form fitting manner, wherein the second fastening element has a pin of spherical design, and the first fastening element has a sleeve which can engage over the pin of spherical design in order to produce a form fitting connection, and wherein the first fastening element furthermore has a securing means for securing the fastening elements connected to each other in a form fitting manner. It is provided that said securing means is in the form of a cap which is held in an axially movable manner on the outer circumferential surface of the sleeve, wherein the securing or fixing of the sleeve on the pin of spherical design can be brought about via an axial relative movement of the cap from a defined first position, i.e. a preassembly position, into a defined second position, i.e. a final assembly position.

The inventors have found it disadvantageous that the final assembly position can easily be brought about unintentionally in the prior art before a correct arrangement on the pin has taken place. When the first and second parts are unintentionally brought into the final assembly position, this causes a complicated re producing of the preassembly position or the rejection of the fastener involved.

SUMMARY

It was the object of the invention to improve the above disadvantage. The object is achieved by the invention, in particular as defined in the claims.

In particular, this object is achieved by a vehicle component fastener, wherein the vehicle component fastener is designed for fastening a first component to a second component of a vehicle, wherein the fastener has a first part and a second part, wherein the first part has a pin socket for receiving the head of a ball pin or T pin of the second component, wherein the second part has a fastening structure for the fastening of the first component, wherein the first part and the second part are connected to each other via a preassembly locking device in a preassembly position, from which the first part and the second part are transferable by axial displacement in relation to each other into a final assembly position, wherein the preassembly locking device is designed to be released by introduction of the head of the ball pin or T pin into the pin socket such that the axial displacement into the final assembly position a) can be carried out with less effort (less axial insertion force) than when the head of the ball pin or T pin is not introduced into the pin socket, or b) can be carried out at all.

This provides an improved pre-locking of the first and second parts to each other, said pre-locking no longer being so easily released unintentionally; instead, only when the fastener has been positioned on the head of the pin.

In case a), it is, for example, possible to select very powerful pre-locking which, without the positioning on the pin head, can be released only with a very great effort so that the first and the second parts can be brought into the final assembly position. By placing the fastener onto the pin head, only a reduced effort is then necessary in order to bring the second part into the final assembly position.

In case b), the pre-locking can be weak or powerful, but can be designed to be self-locking, and therefore even a higher force does not bend open the pre-locking—except by means of destruction of the preassembly locking device.

In the prior art, it makes no difference whether the pin is or is not accommodated in the pin socket: the force for displacing the second part axially (in the drawings: from the top downward) into the final assembly position is always possible with the same effort; erroneous locking in the final assembly position is therefore not any more difficult than the correct locking in the final assembly position, and this can easily lead to erroneous locking.

The first part is preferably accommodated at least partially in an axial opening of the second part, preferably concentrically in the second part.

The fastening structure for fastening the first component is, for example, a locking or clip device, preferably for fastening at an aperture of the first component. It preferably has means for centering the fastener relative to the aperture of the first component.

The ball pin or T pin of the second component can be an integral part of the second component and can already be connected to the second component, or not.

The fastener is preferably supplied to the assembly belt in the preassembly position. The fastener is then placed onto the pin, as a result of which the preassembly locking device is released, and then the second part is pressed onto the first part into the final assembly position in which the fastener produces a fixed connection between pin and the second part, and therefore preferably between the first and second component.

In a further exemplary embodiment of the invention, it is provided that the preassembly locking device has at least one sensing means which is designed to determine the state of the introduced head of the ball pin or T pin into the pin socket, and wherein the preassembly locking device is designed to be released correspondingly depending on the state determined by the sensing means.

This facilitates the release of the preassembly locking device dependent on the state.

In a further exemplary embodiment of the invention, it is provided that the preassembly locking device consists at least of at least one recess, preferably of two or more recesses, in the pin socket and at least one locking element, preferably of two or more locking elements, of the second part, wherein, in the preassembly position, the, preferably respective, locking element protrudes from the outside through the, preferably respective, recess into the interior of the pin socket over an inner surface of the pin socket and is located in a first position, wherein preferably the protruding part of the locking element forms the sensing means, wherein the, preferably respective, locking element, when it is pressed from the inside out of the pin socket back into the, preferably respective, recess such that it protrudes less or no longer over the inner surface of the pin socket, is located in a second position, wherein, when the, preferably respective, locking element is located in the second position, the axial displacement into the final assembly position a) can be carried out with less effort than when the locking element is located in the first position, or b) can be carried out at all, whereas said displacement is not possible when the locking element, preferably at least one, preferably all of the locking elements which are present, is/are located in the first position.

This provides an advantageous design of a preassembly locking holder which can be realized by injection molding.

The locking element or the locking elements is or are preferably each in the form of a latching arm.

In a further exemplary embodiment of the invention, it is provided that the preassembly locking device consists of at least one further locking element of the second part and at least one further recess of the pin socket, wherein, in the preassembly position, the locking elements protrude through the respective recesses, wherein the locking elements extend more axially than radially and are movable flexibly in the radial direction between the first and the second position.

The pre-locking is thereby even more reliable.

In a further exemplary embodiment of the invention, it is provided that the respective locking element has a locking surface which, in the preassembly position, lies against a mating surface on the edge of the recess and which a) impairs or b) blocks the axial displacement into the final assembly position by the locking surfaces and the mating surface being perpendicular to the axial dis-placement direction or angled in such a manner that a displacement bends the respective locking element from the first position in the direction opposed to the second position.

This results in an advantageous configuration of the locking elements and the blocking function thereof.

In a further exemplary embodiment of the invention, it is provided that the respective mating surface on the radially outer edge is beveled or rounded in the direction of the axial direction in which the displacement also takes place from the preassembly position into the final assembly position.

The pre-locking is thereby released more reliably when the pin has been placed in the pin socket.

In a further exemplary embodiment of the invention, it is provided that the respective locking element has a radial inwardly directed projection, preferably at the distal, free end of the locking element, which forms the respective sensing means.

An advantageous configuration of the sensing element/sensing elements is thereby provided.

The projection is preferably rounded or beveled at its point, which is advantageous for more reliable release of the locking without catching.

In a further exemplary embodiment of the invention, it is provided that the first part starting from the mating surfaces in each case has an axial channel assigned to the respective sensing means, or an axial recess, and wherein the respective sensing means is designed to be moved axially in the axial channel or the axial recess during the axial displacement into the final assembly position.

This reduces the probability of the sensing means catching on the mating surface.

In a further exemplary embodiment of the invention, it is provided that the preassembly locking device is furthermore designed to produce a locking connection in the final assembly position.

By this means, only one preassembly locking device is required in order to lock in the preassembly position and the final assembly position. That is to say, at least one locking element, preferably a plurality of locking elements, particularly preferably all of the locking elements, therefore inherently has or have a dual function.

In a further exemplary embodiment of the invention, it is provided that the locking element, preferably also the further locking element, is designed to lock behind an edge of the pin or of the first part in the final assembly position.

A locking connection in the final assembly position is thereby obtained in a simple manner.

BRIEF DESCRIPTION OF THE DRAWINGS

The invention will now be illustrated further by way of example with reference to drawings, in which:

FIGS. 1A to 1F show a fastener 1 according to the invention in the preassembly position (FIGS. 1A, 1E, 1F), placed onto the pin so that the preassembly locking holder 30 is re-leased (FIG. 1B—see dotted circles) and in the final assembly position on the pin (FIG. 1C), and also an individual view of the second part 20 (FIG. 1D), wherein FIGS. 1A to 1C are 2D sectional drawings, FIGS. 1D and 1E illustrate perspective views and FIG. 1F illustrates a perspective sectional view.

DETAILED DESCRIPTION

Figure 1A:
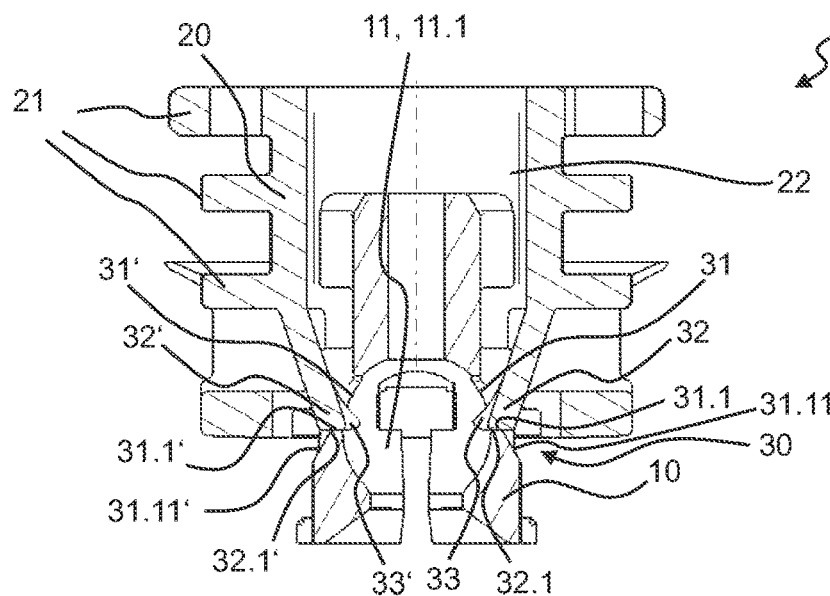
Figure 1B:
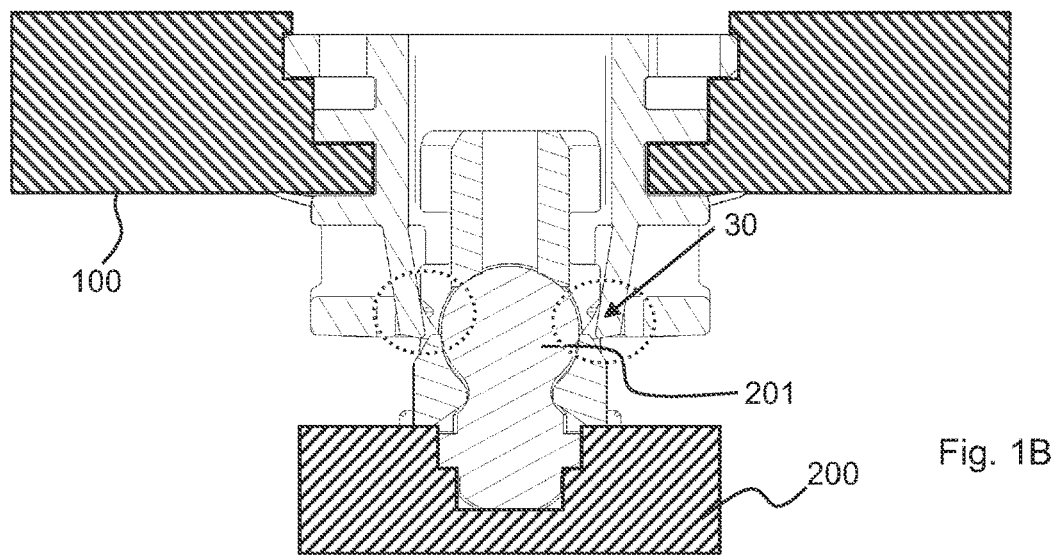
Figure 1C:
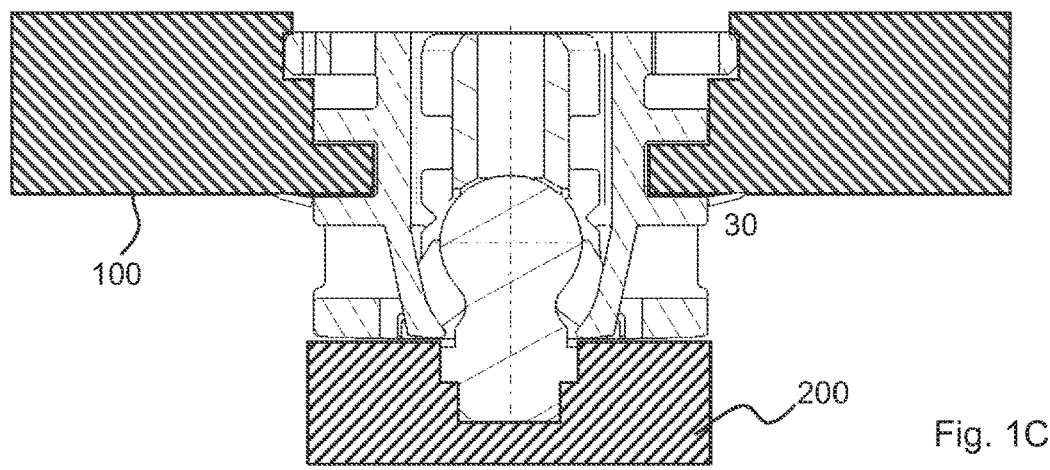
Figure 1D:
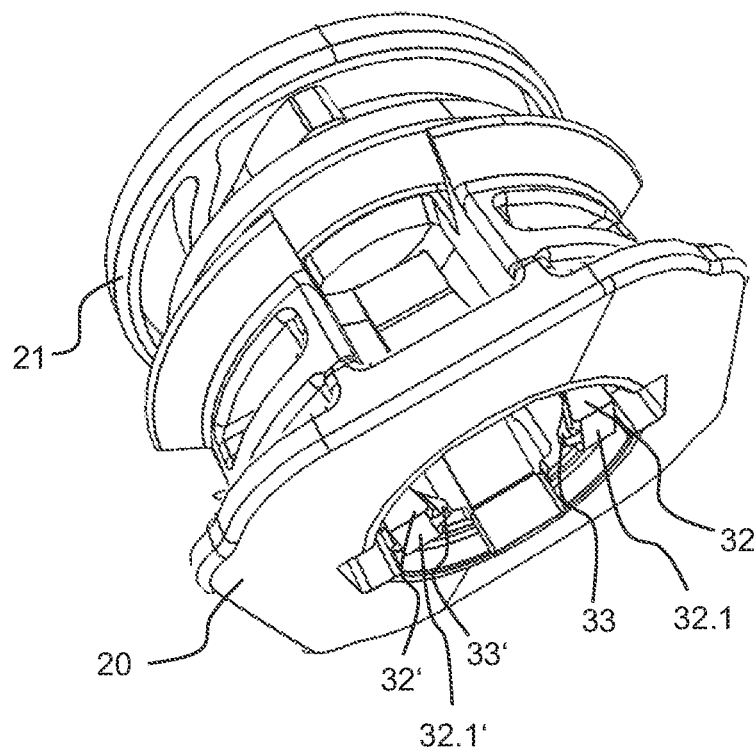
Figure 1E:
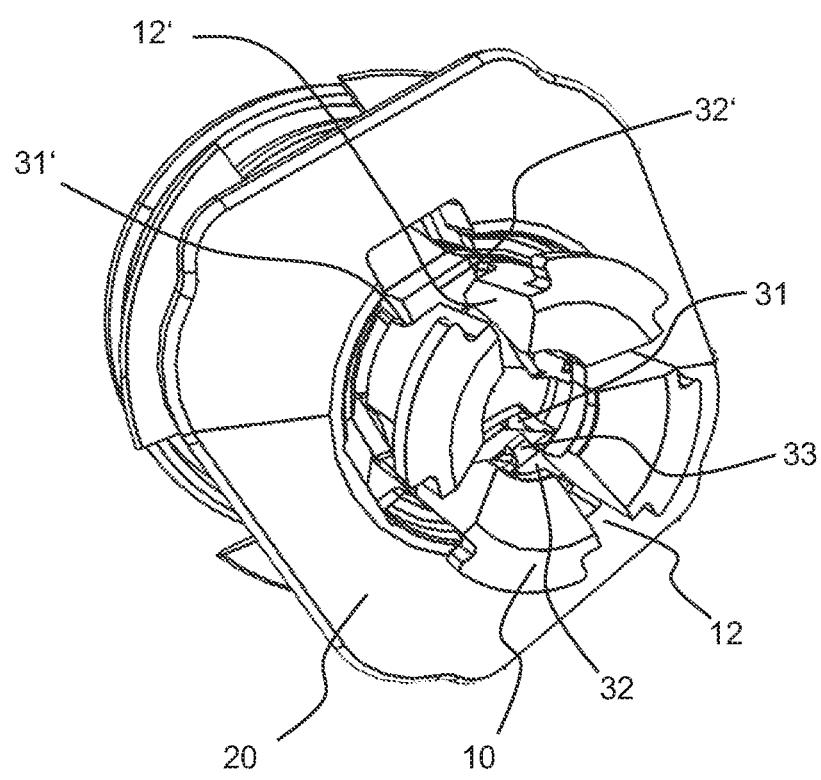
Figure 1F:
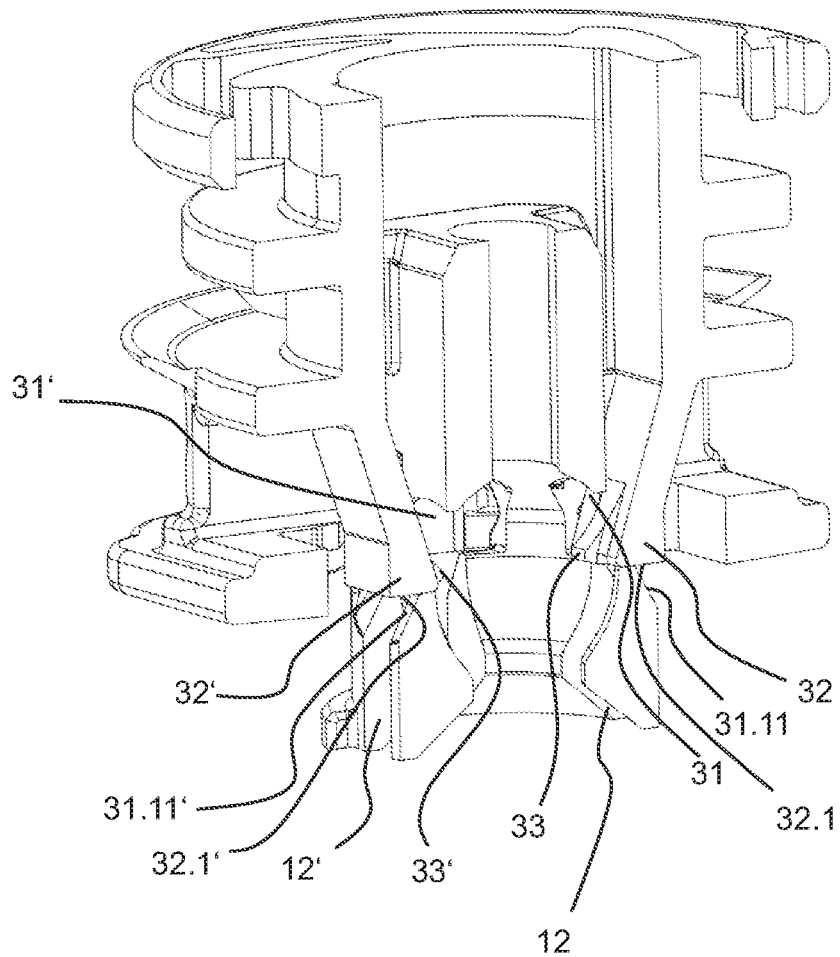

The configuration is such that the vehicle component fastener 1 is designed for fastening a first component 100 to a second component 200 of a vehicle, wherein the fastener 1 has a first part 10 and a second part 20, wherein the first part 10 has a pin socket 11 for receiving the head of a ball pin 201 of the second component 200, where-in the second part 20 has a fastening structure 21 for the fastening of the first component 100, wherein the first part 10 and the second part 20 are connected to each other via a preassembly locking device 30 in a preassembly position, from which the first part 10 and the second part 20 are transferable by axial displacement in relation to each other into a final assembly position, wherein the preassembly locking device 30 is de-signed to be released by introduction of the head of the ball pin 201 into the pin socket 11 such that the axial displacement into the final assembly position can be carried out at all. The pre-locking is configured to be self-blocking, and therefore even a higher force does not bend open the pre-locking—except by means of destruction of the preassembly locking device 30. The first part 10 is at least partially accommodated in an axial opening 22 of the second part 20 concentrically in the second part 20. The fastening structure 21 for the fastening of the first component 100 is a locking or clip device for fastening at an aperture of the first component 100. It has means for centering the fastener 1 relative to the aperture of the first component 100.

The fastener 1 is supplied to the assembly belt in the preassembly position. The fastener 1 is then placed onto the pin 201, as a result of which the preassembly locking device 30 is released, and then the second part 20 is pressed onto the first part 10 into the final assembly position in which the fastener 1 produces a fixed connection between pin 201 and the second part 20, and therefore between the first and second components 100, 200.

The configuration is furthermore such that the preassembly locking device 30 has two sensing means 33, 33' which are designed to determine the state of the introduced head of the ball pin 201 into the pin socket 11, and wherein the preassembly locking device 30 is designed to be released correspondingly depending on the state determined by the sensing means 33, 33'. The configuration is such that the preassembly locking device 30 consists of two recesses 31, 31' in the pin socket 11 and
two locking elements 32, 32' of the second part 20,
wherein, in the preassembly position, the respective locking element 32, 32' protrudes from the outside through the respective recess 31 into the interior of the pin socket 11 over an inner surface 11.1 of the pin socket 11 and is located in a first position, wherein the protruding part of the locking element 32, 32' forms the sensing means 33, 33', wherein the respective locking element 32, 32', when it is pressed from the inside out of the pin socket 11 back into the respective recess 31, 31' such that it protrudes less or no longer over the inner surface 11.1 of the pin socket 11, is located in a second position, wherein, when the respective locking element 32, 32' is located in the second position, the axial displacement into the final assembly position can be carried out at all, whereas said displacement is not possible when the locking elements which are present are located in the first position. The locking elements 32, 32' are each in the form of a latching arm. The configuration is consequently such that the preassembly locking device 30 consists of a further locking element 32' of the second part 20 and a further recess 31' of the pin socket 11, wherein, in the preassembly position, the locking elements 32, 32' protrude through the respective recesses 31, 31', wherein the locking elements 32, 32' extend more axially than radially and are movable flexibly in the radial direction between the first and the second position. The configuration is such that the respective locking element 32, 32' has a locking surface 32.1, 32.1' which, in the preassembly position, lies against a mating surface 31.1, 31.1' on the edge of the recess 31, 31' and blocks the axial displacement into the final assembly position by the locking surfaces 32.1, 32.1' and the mating surface 31.1, 31.1' being perpendicular to the axial displacement direction. The configuration is such that the respective mating surface 31.1, 31.1' on the radially outer edge is beveled 31.11, 31.11' in the axial direction in which the displacement also takes place from the preassembly position into the final assembly position. The configuration is such that the respective locking element 32, 32' has a radial inwardly directed projection at the distal, free end of the locking element 32, 32' which forms the respective sensing means 33, 33'. The projection is rounded at its point. The configuration is such that the first part 10 starting from the mating surfaces 31.1, 31.1' in each case has an axial recess 12, 12' assigned to the respective sensing means 33, 33', wherein the respective sensing means 33, 33' is designed to be moved axially in the axial recess 12, 12' during the axial displacement into the final assembly position. The configuration is such that the preassembly locking device 30 is furthermore designed to produce a locking connection in the final assembly position. The configuration is such that the locking elements 32, 32' are designed to lock behind an edge of the first part 10 in the final assembly position.

REFERENCE SIGNS

1 Vehicle component fastener
10 First part
11 Pin socket
11.1 Inner surface
12 Axial channel or recess
20 Second part
21 Fastening structure
22 Axial opening
30 Preassembly locking device
31 Recess
31.1 Mating surface
31.11 Bevel
32 Locking element
32.1 Locking surface
33 Sensing means
100 First component
200 Second component
201 Ball pin or T pin

What is claimed is:

1. A vehicle component fastener, wherein the vehicle component fastener is designed for fastening a first component to a second component of a vehicle, wherein the vehicle component fastener has a first part and a second part, wherein the first part has a pin socket for receiving a head of a ball pin or T pin of the second component, wherein the second part has a fastening structure for the fastening of the first component, wherein the first part and the second part are connected to each other via a preassembly locking device in a preassembly position, from which the first part and the second part are transferable by axial displacement in relation to each other into a final assembly position, wherein the axial displacement is in a axial direction in which displacement takes place from the preassembling position into the final assembly position, wherein the preassembly locking device is designed to be released by introduction of the head of the ball pin or T pin into the pin socket such that the axial displacement into the final assembly position
   a) can be carried out with less of an axial insertion force than when the head of the ball pin or T pin is not introduced into the pin socket, or
   b) can be carried out at all.

2. The vehicle component fastener as claimed in claim 1, wherein the preassembly locking device has at least one sensing means which is designed to determine the state of the introduced head of the ball pin or T pin into the pin socket, and wherein the preassembly locking device is designed to be re-leased correspondingly depending on the state determined by the sensing means.

3. The vehicle component fastener as claimed in claim 2, wherein the preassembly locking device includes
   at least one recess in the pin socket and
   at least one locking element of the second part,
   wherein, in the preassembly position, the locking element protrudes from outside through the recess into an interior of the pin socket over an inner surface of the pin socket and is located in a first position,
   wherein the locking element, when the locking element is pressed from inside out of the pin socket back into the recess such that the locking element protrudes less or no longer over the inner surface of the pin socket, is located in a second position,
   wherein, when the locking element is located in the second position, the axial displacement into the final assembly position
   a) can be carried out with less of an axial insertion force than when the locking element is located in the first position, or
   b) can be carried out at all, whereas said axial displacement is not possible when the locking element is located in the first position.

4. The vehicle component fastener as claimed in claim 3, wherein the preassembly locking device includes of at least one further locking element of the second part and at least one further recess of the pin socket, wherein, in the preassembly position, the locking elements protrude through the respective recesses, wherein the locking elements extend more in the axial direction than in a radial direction and are movable flexibly in the radial direction between the first and the second position.

5. The vehicle component fastener as claimed in claim 4, wherein the respective locking element has a locking surface which, in the preassembly position, lies against a mating surface on the edge of the recess and which
   a) impairs or
   b) blocks the axial displacement into the final assembly position by the locking surfaces and the mating surfaces being perpendicular to the axial displacement direction or angled in such a manner that a displacement bends the respective locking element from the first position in the direction opposed to the second position.

6. The vehicle component fastener as claimed in claim 5, wherein the respective mating surface on a radial outer edge is beveled or rounded in a direction of the axial direction in which the displacement also takes place from the preassembly position into the final assembly position.

7. The vehicle component fastener as claimed in claim 3, wherein the respective locking element has a radial inwardly directed projection which forms the respective sensing means.

8. The vehicle component fastener as claimed in claim 5, wherein the first part starting from each respective mating surface has an axial channel, or an axial recess, assigned to the respective sensing means, and wherein the respective sensing means is designed to be moved in the axial direction in the axial channel or the axial recess during the axial displacement into the final assembly position.

9. The vehicle component fastener as claimed in claim 3, wherein the preassembly locking device is furthermore designed to produce a locking connection in the final assembly position.

10. The vehicle component fastener as claimed in claim 9, wherein the locking element is designed to lock behind an edge of the ball pin or T pin or of the first part in the final assembly position.

11. A vehicle component fastener for fastening a first component to a second component of a vehicle, wherein the vehicle component fastener comprises a first part and a second part, wherein the first part has a pin socket for receiving a head of a ball pin or T pin of the second component, wherein the second part has a fastening structure for fastening of the first component, wherein the first part and the second part are connected to each other via a preassembly locking device in a preassembly position in which the first part is partially inserted into the second part, wherein the first part and the second part are transferable by axial displacement in relation to each other into a final assembly position in which the first part is fully inserted into the second part, wherein the axial displacement is in a axial direction in which displacement takes place from the pre-assembling position into the final assembly position, wherein the preassembly locking device is releasable by introduction of the head of the ball pin or T pin into the pin socket such that the axial displacement into the final assembly position
   a) can be carried out with less of an axial insertion force than when the head of the ball pin or T pin is not introduced into the pin socket, or
   b) can be carried out at all.

12. The vehicle component fastener as claimed in claim 11, wherein the preassembly locking device has at least one inward projection which is positioned to be contacted by the head of the ball pin or T pin when inserted into the pin socket such that the preassembly locking device is released by contact between the inward projection and the head.

13. The vehicle component fastener as claimed in claim 12, wherein the preassembly locking device includes
   at least one recess in the pin socket and
   at least one locking element of the second part,
   wherein, in the preassembly position, the locking element protrudes from outside through the recess into an interior of the pin socket over an inner surface of the pin socket and is located in a first position,
   wherein the locking element, when the locking element is pressed from inside out of the pin socket back into the recess such that the locking element protrudes less or no longer over the inner surface of the pin socket, is located in a second position,
   wherein, when the locking element is located in the second position, the axial displacement into the final assembly position
   a) can be carried out with less of an axial insertion force than when the locking element is located in the first position, or
   b) can be carried out at all, whereas said axial displacement is not possible when the locking element is located in the first position.

14. The vehicle component fastener as claimed in claim 13, wherein the preassembly locking device includes of at least one further locking element of the second part and at least one further recess of the pin socket, wherein, in the preassembly position, the locking elements protrude through the respective recesses, wherein the locking elements extend more in the axial direction than in a radial direction and are movable flexibly in the radial direction between the first and the second position.

15. The vehicle component fastener as claimed in claim 14, wherein each respective locking element has a locking surface which, in the preassembly position, lies against a mating surface on an edge of the recess and which
   a) impairs or
   b) blocks the axial displacement into the final assembly position by the locking surfaces and the mating surfaces being perpendicular to the axial displacement direction or angled in such a manner that a displacement bends the respective locking element from the first position in the direction opposed to the second position.

* * * * *